United States Patent [19]
Gurta

[11] 3,912,534
[45] Oct. 14, 1975

[54] METHOD OF RECOVERING GLASS CULLET
[75] Inventor: Daniel J. Gurta, Westland, Mich.
[73] Assignee: Ford Motor Company, Dearborn, Mich.
[22] Filed: Dec. 19, 1974
[21] Appl. No.: 534,511

[52] U.S. Cl. .......................... 134/19; 65/28; 209/11
[51] Int. Cl.² ............................................ B08B 7/00
[58] Field of Search ........ 65/28; 134/19, 20; 209/11

[56] References Cited
UNITED STATES PATENTS

| 2,563,085 | 8/1951 | Utsinger | 134/19 X |
| 3,346,417 | 10/1967 | Ehrlich | 134/19 X |
| 3,734,774 | 5/1973 | Culpepper | 134/19 X |
| 3,744,779 | 7/1973 | Perry | 209/11 X |
| 3,847,664 | 11/1974 | Gravel | 134/19 X |

*Primary Examiner*—Arthur D. Kellogg
*Attorney, Agent, or Firm*—William E. Johnson; Keith L. Zerschling

[57] ABSTRACT

A method of recovering cullet from laminated glass scrap is disclosed. The laminated scrap is crushed to fragment the glass but the glass generally remains in bonding contact with the laminating interlayer. The crushed scrap is mixed as its temperature is increased so that the laminating interlayer softens to permit the interlayer to be torn thus reducing the size of the scrap. The finally divided scrap is heated to a temperature at which the interlayer burns away. Any carbon residue left on the crushed scrap is also burned away. The crushed scrap is cooled and recovered as cullet.

3 Claims, 2 Drawing Figures

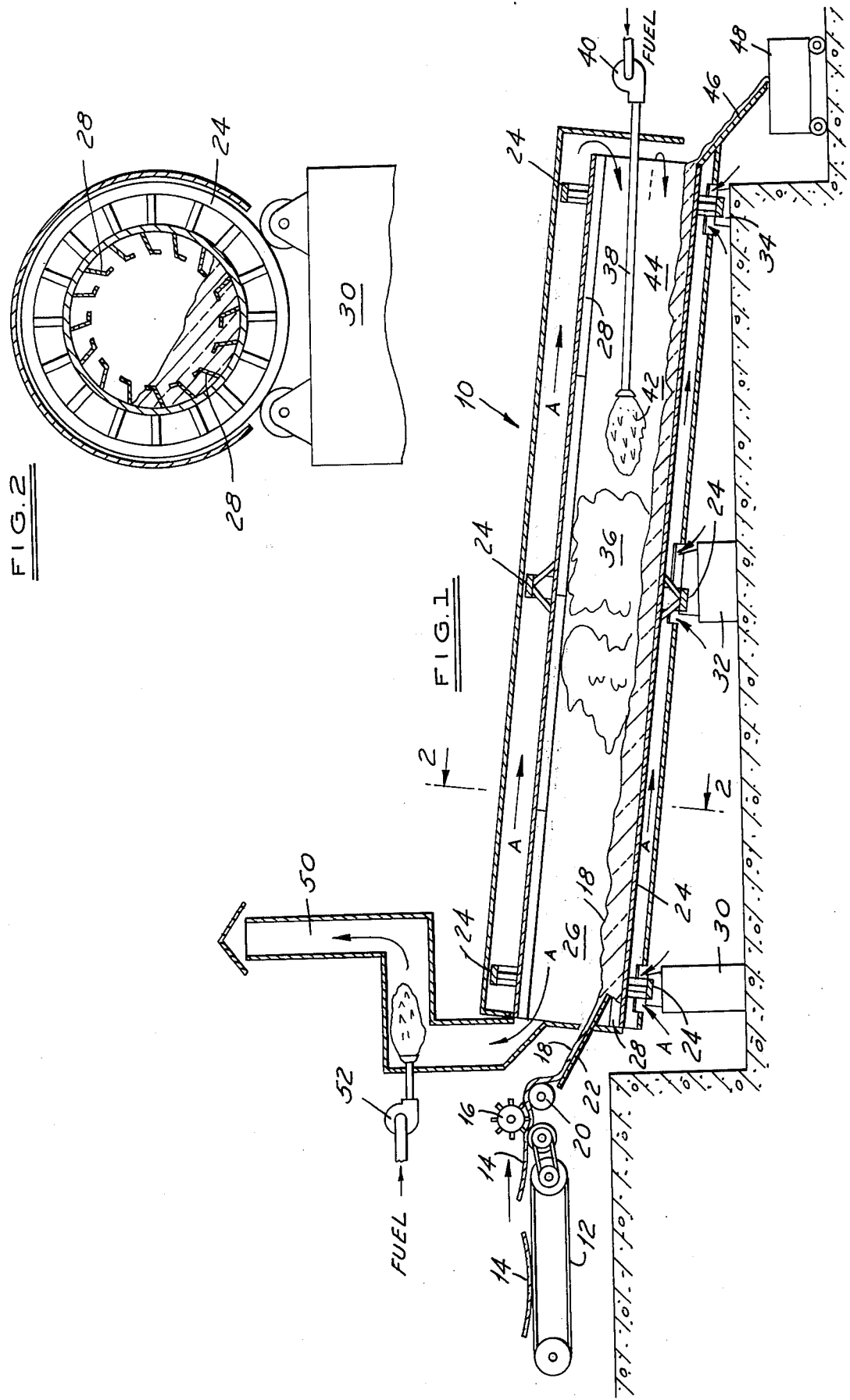

METHOD OF RECOVERING GLASS CULLET

BACKGROUND OF THE INVENTION

Glass cullet, that is finely divided pieces of clean glass, is used as part of a burden for glass melting furnace. The cullet is incorporated with other finely divided glass forming materials to provide the burden which is melted in a glass melting furnace. Clean cullet is at least worth the price per ton of the raw materials which it replaces.

In making safety glass windshield, pairs of glass brackets are laminated together with an interposed laminating interlayer. In making such windshields, there is some spoilage because of processing conditions. Such laminated glass has heretofore been disposed of as a solid waste material. In view of the increase in costs of the raw materials used to manufacture glass and reduction of generated cullet, it is desirable to recover the glass in any spoiled laminated glass product. Useable by-product produced in recovering the cullet may also be recovered in the form of heat and condensed vapors.

It is an object of this invention to provide a method for recovering the glass content of laminated glass scrap. It is a further object of this invention to provide a method of recovering the glass content from such glass scrap in an economical and efficient manner.

SUMMARY OF THE INVENTION

This invention relates to a method of recovering glass cullet and, more particularly, to a method of recovering glass cullet from laminated glass scrap in an economical and efficient manner.

In accordance with the teachings of this invention, the method of recovering glass cullet from laminated glass scrap is initiated by crushing the laminated glass scrap to fragment the glass content thereof. The glass generally remains in bonding contact with a laminating interlayer which laminates the glass together. The crushed laminated scrap is mixed as its temperature is increased so that the laminating interlayer softens thereby permitting the interlayer to be torn thus reducing the size of individual portions of the laminated scrap to a finely divided state. The finely divided, crushed laminated scrap is heated to a temperature at which the interlayer material burns away. Any carbon residue left on the crushed scrap is also burned away, the carbon residue being a by-product of the combustion of the interlayer. The crushed scrap is cooled and recovered as glass cullet. The heating, mixing, burning and cooling steps are preferably carried out in a rotating incinerator.

BRIEF DESCRIPTION OF THE DRAWINGS

FIG. 1 is a side elevational view, partly in cross-section, of an apparatus designed to carry out the method of this invention.

FIG. 2 is a view taken along line 2—2 of FIG. 1 showing a cross-section of the apparatus.

DESCRIPTION OF THE PREFERRED EMBODIMENT

In the drawings, the numeral 10 indicates, in general, an apparatus for performing the method of this invention. With respect to FIG. 1, a conveyer 12 delivers laminated scrap 14 from a source such as a windshield production line. The laminated scrap is in the form of a defectively manufactured windshield in which a pair of glass brackets are laminated together by an interposed laminating layer such as one of polyvinyl butryal. The method for forming such a laminated windshield is well known in the art.

The conveyer 12 delivers the laminated scrap 14 to a crusher device 16 at which the scrap is fragmented. Although the glass is fragmented, the glass generally remains attached to the laminating interlayer. The crusher crushes the scrap so that individual pieces of glass have a size of about 2 sq. in.

Crushed laminated scrap 18 is delivered over a roll 20 onto a charging device 22 of a rotating incinerator 24. The incinerator is rotated by known devices not shown. The rotational rate of the incinerator is about 7 rpm. The incinerator has a diameter of about 4 ft. The incinerator is inclined at a slope of ½ inch/foot so that upon rotation thereof the scrap is slowly mixed as it moves along the length thereof. In an initial zone 26 of the incinerator the crushed scrap is preheated. During the preheating stage the interlayer softens so that as the scrap is mixed, the individual scrap pieces tend to separate from other scrap pieces to form small portions wherein two small pieces of glass are held together with the interlayer material. As is best seen in FIG. 2, individual lifting and mixing blades 28 are disposed about the internal circumference of the incinerator 24 to lift and mix the scrap as the incinerator rotates. The incinerator is mounted for rotation on support blocks 30, 23 and 34.

Scrap moves along the length of the incinerator 24 from the initial zone 26 to a combustion zone 28. In passing between the two zones, the scrap is heated slowly which results in a reduction of the size of individual portions of laminated scrap to a finely divided state as previously described. By the time the scrap reaches the combustion zone 28, sufficient heat has been provided that the interlayer burns. The heat is provided to the combustion zone by a burner 38 at start up, after which the combustion is self supporting. The burner is fed from an air/fuel mixture which enters the burner by way of a pipe 40. The laminating interlayer thus is burned away separating the individual pieces of glass which have been laminated in a back to back manner. In being burned away, the interlayer may leave some residual carbon on the glass pieces. In a flame propagation zone 42 of the incinerator, the residual carbon is burned away. The pieces of glass then pass beyond the flame propagation zone into a cooling zone 44. After cooling the individual glass pieces 46 are discharged into a cullet collector 48.

Combustion air for the process is drawn into the incinerator 24 in a countercurrent manner so it may be preheated prior to entry into the burning zone of the incinerator 24. In particular, arrows A indicate the flow of the air to and through the incinerator. The gases produced in the combustion process are discharged to the atmosphere through a stack 50. The stack may have an afterburner 52 mounted therein for cleaning up and buring off any residual materials so that the discharge complies with local ordinances. The gases may also be condensed to recover that portion of the interlayer which might be vaporized rather than burned.

There has been disclosed herein a method for producing clean cullet from laminated scrap. The method is simple and efficient in operation and produces extremely clean cullet which may be used as an ingredient for the burden to be supplied to a glass melting tank.
Many modifications of this invention will be apparent to those skilled in the art in view of the teachings of this specification. It is intended that all such teachings or improvements be within the scope of the apended claims.

I claim:
1. A method of recovering glass cullet from laminated glass scrap which comprises the steps of:
   crushing the laminated glass scrap to fragment the glass although it generally remains in bonding contact with a laminating interlayer;
   slowly raising the temperature of the crushed laminated scrap;
   mixing the crushed laminated scrap as its temperature is increased so that the laminating interlayer softens thereby permitting the interlayer to be torn thus reducing the size of individual portions of the laminated scrap to a finely divided state;
   heating the finely divided crushed laminated scrap to a temperature at which the interlayer material is substantially removed from the crushed scrap;
   burning away any carbon residue left on the crushed scrap after the interlayer material has been removed;
   cooling the crushed scrap; and
   recovering the crushed scrap for use as cullet.
2. The process of claim 1 wherein the slow heating of the crushed, laminated scrap, the mixing, and the heating, the burning and the cooling steps all take place in a continuously rotating drum.
3. The process of claim 2 wherein air for removing the carbon and the laminating interlayer is preheated by moving along the length of the outer surface of the rotating drum.

* * * * *